(12) United States Patent
Rasche et al.

(10) Patent No.: US 8,098,919 B2
(45) Date of Patent: Jan. 17, 2012

(54) THREE-DIMENSIONAL RECONSTRUCTION OF AN OBJECT FROM PROJECTION PHOTOGRAPHS

(75) Inventors: Volker Rasche, Wellesley, MA (US); Babak Movassaghi, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1062 days.

(21) Appl. No.: 10/595,875

(22) PCT Filed: Nov. 16, 2004

(86) PCT No.: PCT/IB2004/052436
§ 371 (c)(1), (2), (4) Date: Apr. 6, 2007

(87) PCT Pub. No.: WO2005/052862
PCT Pub. Date: Jun. 9, 2005

(65) Prior Publication Data
US 2007/0263916 A1 Nov. 15, 2007

(30) Foreign Application Priority Data
Nov. 28, 2003 (EP) .................................. 03104442

(51) Int. Cl.
*G06K 9/00* (2006.01)
(52) U.S. Cl. .................... 382/132; 382/190; 345/427
(58) Field of Classification Search .................. 382/154, 382/132, 190; 345/427
See application file for complete search history.

(56) References Cited

U.S. PATENT DOCUMENTS

| | | | | |
|---|---|---|---|---|
| 4,901,019 A | * | 2/1990 | Wedeen | 324/309 |
| 5,444,791 A | * | 8/1995 | Kamada et al. | 382/190 |
| 6,184,892 B1 | * | 2/2001 | Toriu et al. | 345/427 |
| 6,501,848 B1 | | 12/2002 | Carroll et al. | |

OTHER PUBLICATIONS

S.-Y.J. Shen et al, "Dynamic Reconstruction of 3D Coronary Arterial Trees Based on a Sequence of Biplane Angiograms", Proceed. Of the SPIE, vol. 3034, pp. 358-368, 1997.
B. Movassaghi et al, "Quantitative Analysis of 3D Coronary Modeling in 3D Rotating X-ray Imaging", 2002 IEEE Nuclear Science Symposium Conf. Record; 2002 IEEE Nuclear Science Symposium and Medical Imaging Conf. Norfolk, VA, Nov. 10-16, 2002, vol. 3 of 3, pp. 878-880.
Zheng et al., "Automatic Feature Point Extraction and Tracking in Image Sequences for Unknown Camera Motion", Computer vision, 1993, Proceedings 4th Intl. Conf. in Berlin, Germany, May 11-14, 1993, pp. 335-339.

* cited by examiner

Primary Examiner — Hadi Akhavannik

(57) ABSTRACT

A method for the three-dimensional reconstruction of an object, or its surroundings, in a moving body volume of a patient includes obtaining a series of X-ray projection photographs produced from different directions, with a relevant ECG phase or respiration being recorded simultaneously. Projection photographs of the moving body volume are transformed such that the images of feature points that are located on the projection photographs respectively come to rest at a place on which randomly set spatial reference positions for the feature points are projected. With the projection photographs aligned onto the reference positions, three-dimensional reconstruction of the object can subsequently take place.

10 Claims, 4 Drawing Sheets

THREE-DIMENSIONAL RECONSTRUCTION OF AN OBJECT FROM PROJECTION PHOTOGRAPHS

The invention relates to a device and a method for the three-dimensional reconstruction of a moving object in a body volume, wherein the body volume can be subject to a cyclical self-movement, for example through heartbeat or breathing.

The execution of intravascular medical interventions such as for example the placing of a stent at a stenosis of the coronary vessels usually takes place under X-ray fluoroscopy observation. For monitoring the placement of the stent, it would be helpful here to be able to visualize it three-dimensionally, as accurately as possible. Such visualization is however not readily possible with the known three-dimensional imaging methods of computer tomography, since due to the heartbeat and respiration, the stent is subject to constant movement and deformation.

In this connection, for the three-dimensional reconstruction of vascular trees, we know of the production during a heartbeat phase of two projection series of the vessels filled with contrast medium from different directions (S.-Y. J. Shen, J. D. Carroll: "Dynamic reconstruction of 3D coronary arterial trees based on a sequence of biplane angiograms", in *Proceedings of the SPIE*, vol. 3034, pp. 358-368 (1997)). On the projection photographs, distinctive points such as e.g. bifurcations are segmented, and from two projections from the same stage in the photo sequences but from different projection directions, the spatial position of these distinctive points is reconstructed. Finally, from all such reconstructed positions, the movement of the points and thus of the vascular system during the heartbeat is determined. The application of the method to the localization of objects such as intervention devices is not described. Furthermore, the method requires that the photographic sequences are recorded at high rate over the duration of precisely one heartbeat.

Against this background, it was an object on the invention to provide the means for localizing an object such as for example an intervention device in the vascular system of a patient, wherein the object and/or the surrounding body volume can be subject to a cyclical or non-cyclical movement.

This object is fulfilled by a device with the features of claim 1, by a device with the features of claim 4, by a method with the features of claim 9 and by a method with the features of claim 10. Advantageous embodiments are contained in the dependent claims.

According to a first aspect of the invention, the device in accordance with the invention serves the purpose of three-dimensional reconstruction of a moving object in a body volume. The object can be in particular a body structure (organ, vessel section, the body volume itself etc.) or an intervention device on a catheter, such as e.g. a stent, a balloon or a guide wire, wherein however the invention is not restricted to medical applications. The movement of the object can take place relative to the body volume (e.g. advancement of a catheter) and/or together with a movement of the body volume (e.g. through patient movements, breathing, heartbeat).

The device comprises an (electronic) memory which contains a series of two-dimensional projection photographs of the body volume from different directions. Coupled to the memory is a data processing unit which is set up to execute the following steps:

a) The segmentation of the image of at least one feature point of the object or its surroundings in the projection photographs. According to the definition, a "feature point of the object or its surroundings" here is a point belonging to the object or its surroundings which can be localized relatively well on the projection photographs. For example, it can be a vessel branching or a radio-opaque marking on a guide wire or stent. Furthermore, "segmentation" is understood in the usual manner to mean the allocation of an image point to an object (here: the feature point). For preference, two or more different feature points are segmented and respectively subjected to the subsequent further processing formulated for "the feature point".

b) The specification of a spatial reference position for the feature point. The "true" spatial position of the feature point (at a particular point in time) cannot be established with certainty even from several projection photographs, because of the unknown movement of the object. For this reason, a reference position is set more or less randomly here, which is subsequently taken as the basis for interpretation and alignment of the photographs.

c) Calculation of transformations of the three-dimensional object space and of the two-dimensional projection photographs, after the use of which the projection of the (transformed) reference position respectively coincides with the (transformed) image of the feature point. Typically, one of these transformations is set as the identity, so that effectively either a true transformation of the object space of a true transformation of the projection photographs takes place. A "true" transformation can for example be a translation, rotation, dilation (volume change), and/or—in more complex formulations—an affine transformation.

In step c) for example the projection photographs can be transformed such that the image of the feature point that is segmented in step a) comes to rest at a place on which the reference position defined in step b) is projected. Alternatively, for each projection photograph the reference position can be transformed into a new position, whose projection then lies on the image of the feature point that was segmented in step a). In both cases, transformations are established which describe an alignment of the projection photographs onto the reference position (or an alignment of the reference position onto the projection photographs respectively).

d) The three-dimensional reconstruction of the object and, if applicable, of the surroundings of the object, i.e. in general of a region of interest, from the stored projection photographs, using the transformations calculated according to step e).

The device has the advantage that the object, or region of interest in the case of the object, can be reconstructed using all the projection photographs from the memory. This succeeds since changes in the position and shape of the moving object can be compensated with the aid of the transformations. It is of particular advantage in this connection that the movement of the object can be of practically any kind.

The assumed spatial reference position of a feature point in step b) of the method can in principle be set as desired. However, advantageously it is defined such that it lies as close as possible to a real or the most probable current position of the feature point. In particular, the reference position can be reconstructed geometrically from two projection photographs that were taken when the body volume was in the same type of state, but from different directions. In this case it can be assumed that during the production of the two projection photographs, a feature point lay at approximately the same spatial position, which can therefore be reconstructed exactly. With regard to the state of the body volume, this can be in particular the heartbeat phase, which is typically recorded with an ECG.

According to a second aspect of the invention, the invention relates to the three-dimensional reconstruction of an object in a body volume that is subject to cyclical self-movement. The object can in particular be a body structure (organ, vessel section etc.) or an intervention device on a catheter such as e.g. a stent, a balloon or a guide wire, wherein however the invention is not restricted to medical applications. The cyclical self-movement is typically one such as is caused by the heartbeat and/or breathing in a biological body.

The device comprises an (electronic) memory which contains a series of two dimensional projection photographs of the body volume from different directions. For each of the projection photographs, the memory also includes the corresponding values of a parameter that characterizes the cyclical self-movement of the body volume at the point in time when the projection photograph is produced. The parameter can be for example an ECG value. Coupled to the memory is a data processing unit that is set up to execute the following steps:

a) Segmentation of the image of at least one feature point of the object in the projection photographs. A "feature point of the object" here is, as already explained, a point belonging to the object, which can be relatively well localized on the projection photographs. Preferably, two or more different feature points of the object are segmented and subjected to the subsequent further processing formulated for "the feature point".

b) Classification of said projection photographs into classes, wherein each of the classes collects together all the projection photographs that belong to a particular phase of the cyclical self-movement that is assigned to the class.

c) Three-dimensional localization of the feature point for each of the classes named above from at least two projection photographs of the corresponding class. Such localization is possible in principle since according to the requirements, the projection photographs have been produced from different directions. Localization is also practically possible and sensible since the projection photographs that are used originate from the same class and thus the same phase of the cyclical self-movement, and the body volume thus has approximately the same shape and position in the projection photographs.

d) Calculation of three-dimensional transformations, wherein a transformation describes (amongst other things) the movement or displacement of the feature point during the transition from one phase of the cyclical self-movement to another. Determination of such transformations is possible since from step c), the spatial position of the feature point in the different phases of the cyclical self-movement that correspond to the classes is known. In the simplest case, the transformation is a translation, which describes the linear displacement of a point. If more than two feature points are observed, the transformation can also be a rotation, a dilation (volume change), and/or—in more complex formulations—an affine transformation.

e) Three-dimensional reconstruction of the object and, if applicable, the surroundings of the object, i.e. in general of a region of interest, from the stored projection photographs, using the transformations calculated according to step d).

The device has the advantage that the object, or region of interest in the case of the object, can be reconstructed using all the projection photographs from the memory. This succeeds since changes in the position and shape of the object due to the cyclical self-movement of the body volume can be compensated with the aid of the transformations, since the transformations describe—at least approximately—the effect of the self-movement mathematically.

Preferred designs of the invention, which can be applied for each of the two devices according to the first and second aspects of the invention, will be elucidated below, wherein for the sake of simplicity we shall speak only of "the device".

Segmentation of the images of the at least one feature point in step a) can, in the case of the device, take place fully automatically or semi-automatically. In the latter case, the device preferably includes an input unit coupled to the data processing unit, such as a keyboard and/or a mouse, via which the user can support the segmentation interactively.

The device furthermore comprises at least one image-producing device, with which the series of two-dimensional projection photographs of the body volume that are stored in the memory can be produced. This device can be in particular an X-ray apparatus for producing X-ray projections and/or an NMR device.

The device furthermore comprises a sensor device for recording a parameter that characterizes a (or the named) cyclical self-movement of the body volume in parallel with the production of the projection photographs. The sensor device can be in particular an electrocardiograph device for recording an electrocardiogram and/or a respiration sensor for recording the respiration phase.

The invention furthermore relates to a method for the three-dimensional reconstruction of a moving object in a body volume based on a quantity of data which contains a series of two-dimensional projection photographs of the body volume from different directions, comprising the steps:

a) Segmentation of the image of at least one feature point of the object or its surroundings in the projection photographs;
b) Specification of a spatial reference position for each feature point;
c) Calculation of transformations of the object space and of the projection photographs, after the use of which the projections of the transformed reference points in each transformed projection photograph coincide with the images of the feature points each time;
d) Three-dimensional reconstruction of the object from the projection photographs with the aid of the calculated transformations.

The invention furthermore relates to a method for the three-dimensional reconstruction of an object in a body volume that is subject to a cyclical self-movement, based on a quantity of data which contains a series of two-dimensional projection photographs of the body volume from different directions together with the respectively corresponding values of a parameter that characterizes the cyclical self-movement, comprising the steps:

a) Segmentation of the image of at least one feature point of the object in the projection photographs;
b) Classification of the projection photographs into classes which each correspond to a given phase of the cyclical self-movement;
c) Three-dimensional localization of said feature point for each of the said classes from at least two projection photographs of this class;
d) Calculation of three-dimensional transformations which describe the movement of the localized feature point between different phases of the cyclical self-movement;
e) Three-dimensional reconstruction of the object from the projection photographs with the aid of the calculated transformations.

The two methods include in general form the steps that can be executed with the devices of the type described above. In respect of the explanation of detail's, advantages and further aspects of the method, we refer to the description given above.

These and other aspects of the invention are apparent from and will be elucidated with reference to the embodiments described hereinafter.

IN THE DRAWINGS

Figure 4A:
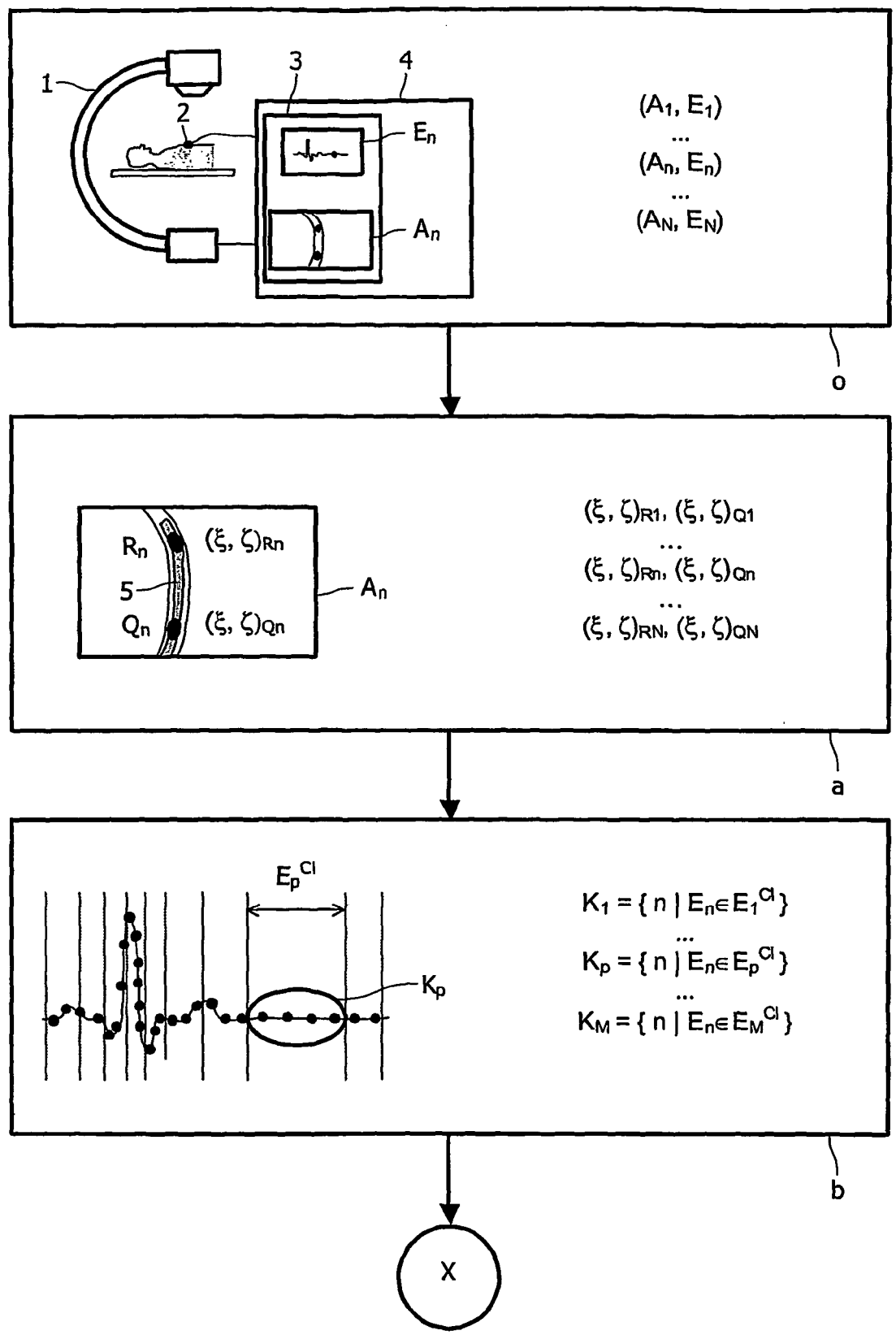

FIGS. 4a, b show a schematic flow diagram for a method for the three-dimensional reconstruction of an object from X-ray images from different heartbeat phases.

Figure 1:
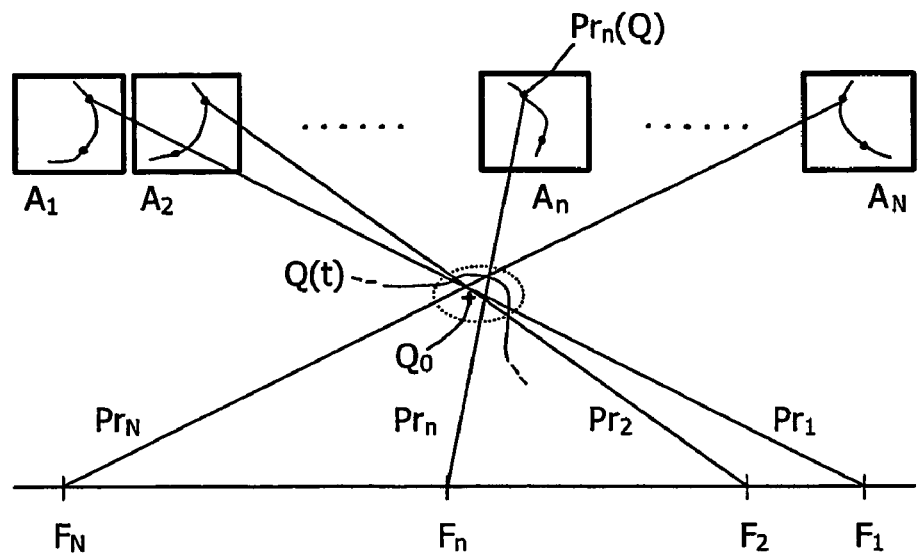
FIG. 1 shows a schematic representation of the projection geometry in the production of X-ray pictures of a moving object.
Figure 2:
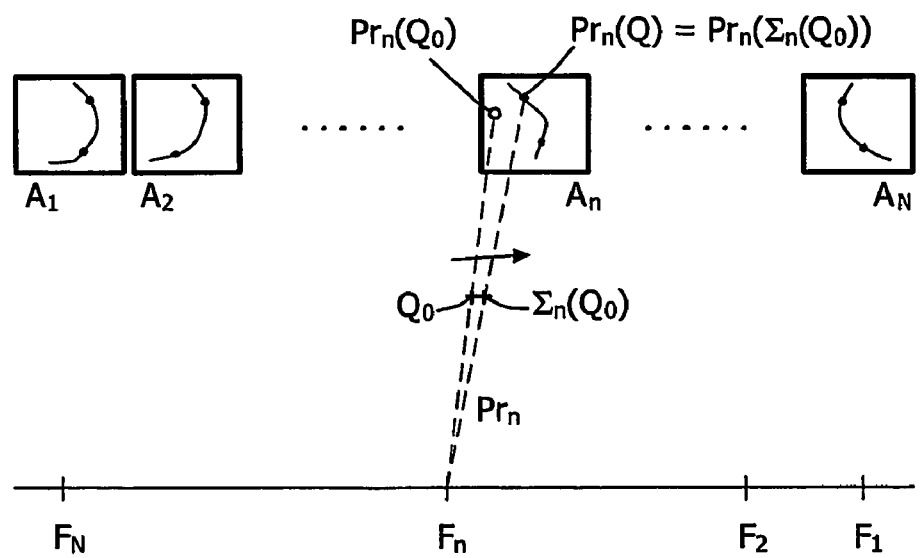
FIG. 2 shows the effect of transformations calculated for the object space for compensating the object movement.
Figure 3:
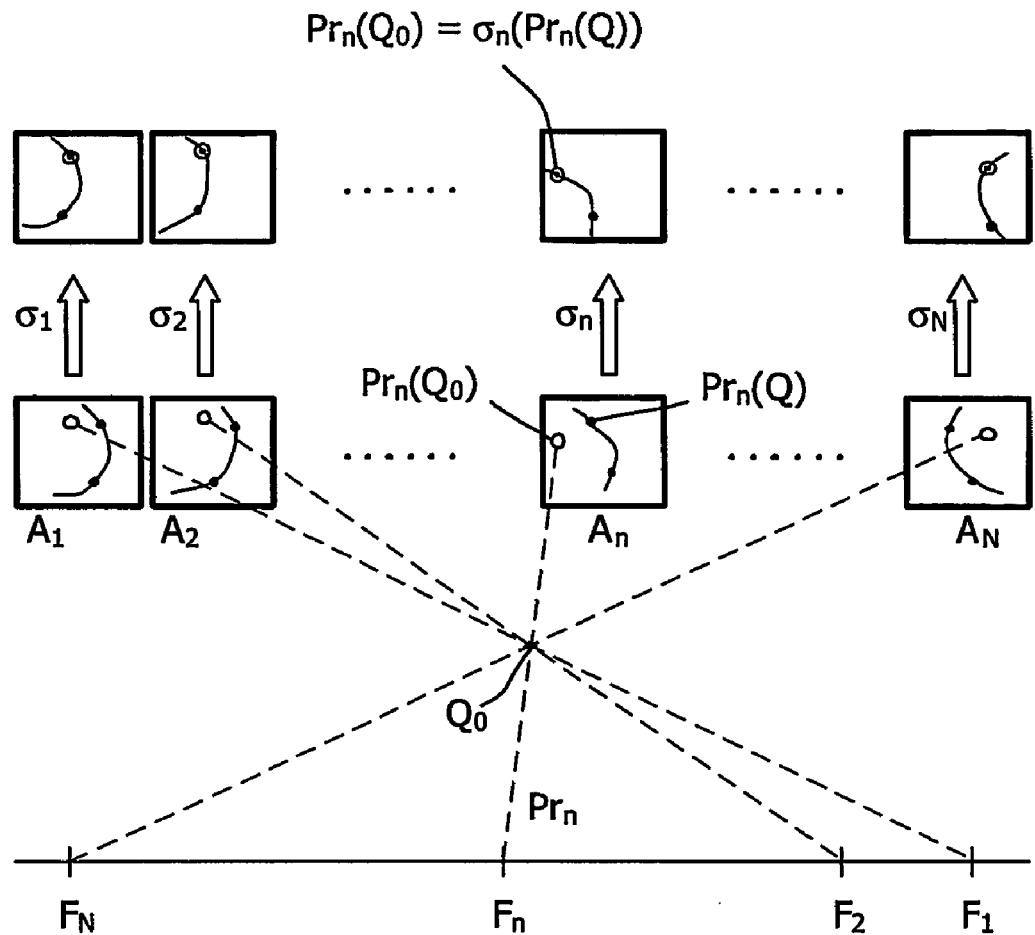
FIG. 3 shows the effect of transformations calculated for the projection photographs for compensating the object movement.

First of all, a first embodiment of the invention is elucidated on the basis of FIGS. 1 to 3. In the case of the underlying method, the task is to carry out the three-dimensional reconstruction of a moving object (e.g. of a stent or of the body volume itself) with the aid of two-dimensional X-ray projection photographs $A_1, A_2, \ldots A_n, \ldots A_N$ of the object which have been taken from different projection directions.

In this regard, FIGS. 1 to 3 show, in schematic form, the projection geometry that is present when a series of X-ray photographs is produced during a sweep of a rotating X-ray apparatus. Here, the X-ray pictures $A_1, A_2, \ldots A_n, \ldots A_N$ are taken starting from projection centers $F_1, F_2, \ldots F_n, \ldots F_N$. In the Figures, shown schematically on the projection photographs is a vessel section which is depicted differently in each case due to the different projection directions and the movement of the body volume that is photographed (through movement by the patient, heartbeat, breathing etc.). Without the movement, the object of interest could be reconstructed exactly three-dimensionally from the projection photographs. However, in practice the object moves in an unknown manner, so that for a feature point Q that is firmly connected to the object, the movement trajectory Q(t) shown schematically in FIG. 1 results. As a rule therefore each of the projection photographs $A_1, A_2, \ldots A_n, \ldots A_N$ records the feature point Q at a different, unknown point of the trajectory. In order nevertheless to obtain as good a reconstruction of the object as possible, the method for compensating the movement as explained below is proposed.

The method is based on tracking at least one feature point, such as for example a marking point on a catheter or a branching point of a vessel. For this, besides the aforementioned feature point Q, preferably one or more further feature points, not shown in greater detail in FIGS. 1 to 3, are used. As per the requirements, the images of a feature point that are produced through the X-ray projections can be easily localized on the projection photographs. Thus for example in the projection photograph $A_n$, the image $Pr_n(Q)$ of the feature point Q that is produced with the $n^{th}$ projection $Pr_n$ can be segmented fully automatically or semi-automatically. A similar procedure applies for the other projection photographs $A_1, A_2, \ldots A_N$.

Also shown in FIG. 1 are the projection lines that connect the respective projection center $F_n$ with the image $Pr_n(Q)$ of the feature point Q. If the feature point were not to move, then all the projection lines would have to intersect in it, so that its spatial position could be reconstructed exactly. However, due to the movement of the feature point Q there is not such an intersection of all the corresponding projection lines; rather, these merely come more or less close to one another in a small volume (dotted in FIG. 1).

In the next step of the method, a reference position $Q_0$ is established (randomly), on which subsequently all the projection photographs $A_1, A_2, \ldots A_n, \ldots A_N$ are to be aligned. For preference, this reference position $Q_0$ is placed as close as possible to an actual or probable position of the feature point Q. In the case of the method indicated in FIG. 1, the reference position $Q_0$ is for example placed in the center of the node in which the individual projection lines cross. Alternatively, the reference position could also be placed in the intersection point of two projection lines (if present) that are known to belong to projection photographs from a similar state of movement of the body volume (for example to the same heartbeat phase in the case of cardiac images).

Represented in FIG. 2 is a first variant of the movement compensation with the aid of the selected reference point $Q_0$. Here, for each of the projection photographs such as for example for the photograph $A_n$, such a displacement of the reference position $Q_0$ in the space is determined that the projection $Pr_n$ of the new position on the projection photograph $A_n$ falls precisely into the image of the feature point Q. The aforementioned displacement of the reference position $Q_0$ (optionally together with the displacements of other feature points) can now be extended to a three-dimensional transformation $\Sigma_n$ of the entire object space. This transformation $\Sigma_n$ thus describes geometrically the transition (translation, rotation, dilation etc.) of the body volume under observation, from the (fictitious) reference state to the state recorded in the projection photograph $A_n$. Since corresponding transformations $\Sigma_1, \Sigma_2, \ldots \Sigma_N$ can also be calculated for the other projection photographs, the result is that the influence of the movement of the body volume on the projection photographs $A_1, A_2, \ldots A_n, \ldots A_N$ can be compensated computationally. The body volume ban then be reconstructed to a high level of accuracy from the movement-compensated X-ray photographs.

FIG. 3 shows a method of movement compensation that is an alternative to FIG. 2 but is equivalent in terms of the results. By contrast to FIG. 2, here it is not three-dimensional transformations of the object space that are calculated, by two-dimensional transformations $\sigma_1, \sigma_2, \ldots \sigma_n, \ldots \sigma_N$ of the projection photographs $A_1, A_2, \ldots A_N$. In this case, first of all the set reference position $Q_0$ is projected computationally onto the respective projection photographs $A_1, A_2, \ldots A_n, \ldots A_N$ with the aid of the known geometric projections $Pr_n$, which in the projection photograph $A_n$ for example leads to the image $Pr_n(Q_0)$ of the reference position. This calculated image does not as a rule coincide with the represented image $Pr_n(Q)$ of the actual feature point. With the aid of the information available (optionally also including further feature points) however a two-dimensional transformation an can be defined; when this is used, the projection photograph $A_n$ is altered (displaced, rotated etc.) just so that the transformed image of the feature point accords with the calculated image of the reference position $Q_0$, i.e. $\sigma_n(Pr_n(Q))=Pr_n(Q)$.

Through the calculation and application of all two-dimensional transformations $\sigma_1, \sigma_2, \ldots \sigma_n, \ldots \sigma_N$ to the projection photographs $A_1, A_2, \ldots A_n, \ldots A_N$, as a result it is ensured that all projection photographs are compensated on a fictitious, static spatial position $Q_0$ of the feature point. This makes it possible for the body volume, or an object located within it, subsequently to be reconstructed three-dimensionally, using all the (transformed) projection photographs.

As a rule, the randomness in setting the reference positions in the case of the above method leads to the fact that the three-dimensional reconstruction of the body volume can be altered (displaced, rotated, compressed etc.) in relation to the real body volume. For many applications, such as for example the positioning of a stent in a vessel, this circumstance is hardly a disadvantage in practice. Far more important here is the very sharp, hardly blurred representation of the reconstructed volume, which is made possible through the movement compensation.

Figure 4B:
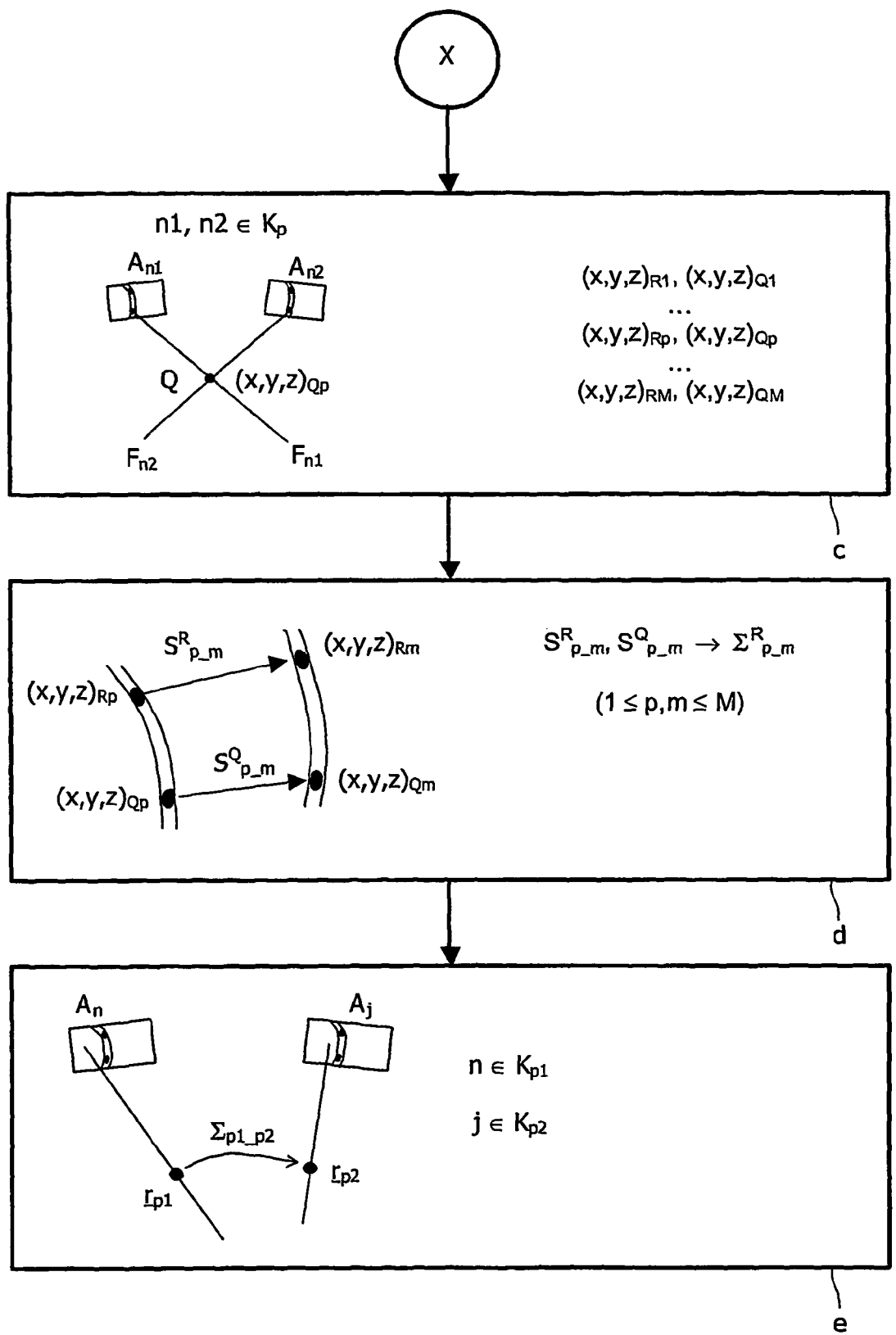

FIG. 4 shows a second embodiment of the invention. In the application case taken as an example here, this involves the localization of a stent 5 which is fitted to the tip of a catheter and is to be unfurled as precisely as possible in the area of a stenosis requiring treatment. For observation of the intervention, a rotary X-ray apparatus 1 is available, with which in one sweep two-dimensional projection photographs $A_n$ of the relevant body volume can be taken from different projection directions.

Due to the heartbeat, the stent 5 that is located in the coronary vessels is constantly moved and possibly also deformed (similar considerations apply for breathing, which for the sake of simplifying the representation is however omitted in the following; fundamentally it can be handled analogously to the heartbeat). This movement takes place relatively quickly compared with the production of projection photographs with the X-ray apparatus 1. This leads to the situation that in a recorded sequence $A_1, \ldots A_n, \ldots A_N$, the projection photographs originate from different heartbeat phases, and in fact as a rule in an unordered sequence. Starting from this circumstance, with the proposed method, and taking account of the movement through the heartbeat, the spatial position of the stent 5 is to be reconstructed as accurately as possible.

In order to achieve the objective mentioned above, in parallel with the X-ray projections $A_n$ a parameter is recorded which indicates the heartbeat phase. This can be for example the electrical signal $E_n$ of an electrocardiogram, which is recorded with the electrocardiograph device 2.

As a result of the preparatory recording procedure represented in block o of FIG. 4a, we thus have a sequence $(A_1, E_1), \ldots (A_n, E_n) \ldots (A_N, E_N)$ of X-ray pictures $A_n$ together with the respective corresponding ECG phase $E_n$ which is stored in the memory 3 of a data processing unit 4.

In the first processing step (block a) of the method, on all the projection photographs $A_n$ the images $R_n$, $Q_n$ of feature points R, Q are then segmented. The feature points are features that are easily visible on the photographs, such as for example markers (on a stent 5, a balloon or a guide wire), or anatomical features such as bifurcations of vessels. As a result of the segmentation, for each photograph AD we know the image co-ordinates $(\xi, \zeta)_{Rn}$, $(\xi, \zeta)_{Qn}$ related to this photograph. Depending on the nature of the feature point, segmentation can take place fully automatically (for example in the case of markers) or semi-automatically (for example in the case of anatomical structure), i.e. with interactive support by a user.

In block b of the method, classification of the available projections $A_n$ into classes $K_1, \ldots K_p, \ldots K_M$ takes place: these correspond respectively to a phase (or, to be more precise, a phase interval) $E_1^{Cl}, \ldots E_p^{Cl}, \ldots E_M^{Cl}$ of the cyclical self-movement. The division of a heartbeat phase into phases $E_p^{Cl}$ (of equal or different lengths) is given here. The classes thus collect the X-ray pictures $A_n$ together into clusters that originate from (roughly) the same heartbeat phase. The classes can be defined formally e.g. as index quantities according to $K_p := \{n | E_n \epsilon E_p^{Cl}\}$.

In block c, for each of the given heartbeat phases $E_p^{Cl}$, the three-dimensional "real" co-ordinates $(x,y,z)_{Rp}$, $(x,y,z)_{Qp}$ of the feature points R and Q are calculated from respectively (at least) two projection photographs $A_{n1}$, $A_{n2}$, wherein said photographs should originate from the same heartbeat phase $E_p^{Cl}$ (i.e. n1, n2$\epsilon K_p$). For this calculation, we refer back to the image co-ordinates $(\xi, \zeta)_{Rn}$, $(\xi, \zeta)_{Qn}$ determined in block a, as well as to the projection centers $F_{n1}$, $F_{n2}$ that are known from the calibration of the equipment. The necessary calculation methods are, moreover, sufficiently well known from the prior art.

In the next block d, the field of movement for each feature point R, Q is calculated in relation to the heartbeat. Here, the spatial co-ordinates $(x,y,z)_{Rp}$, $(x,y,z)_{Qp}$, $(x,y,z)_{Rm}$, $(x,y,z)_{Qm}$ of the feature points known from block c are used in different heartbeat phases p, m, in order to determine for each feature point R, Q a three-dimensional field of movement vectors or displacement vectors $S^R_{p\_m}$, $S^Q_{p\_m}$. The displacement vector $S^Q_{p\_m}$ here describes for example the displacement of the feature point Q with the co-ordinates $(x,y,z)_{Qp}$ in the heartbeat phase p in the transition to the co-ordinates $(x,y,z)_{Qm}$ in the heartbeat phase m.

Based on the displacement vectors $S^R_{p\_m}$, $S^Q_{p\_m}$, furthermore, in block d transformations $\Sigma_{p\_m}$ are determined for the movement of the whole stent 5 or its surroundings. In the simplest case, a rigid translation can be assumed, for the determination of which the displacement vector of a single feature point is sufficient. Usually however more realistic movement models are required, in which at least two feature points R, Q are used for determining a translation, rotation and/or dilation. Using several feature points, it is also possible to determine more complex, for example affine, transformations.

In the last block e, based on the three-dimensional movement model of the object 5 (block d), a reconstruction—which is compensated in respect of the three-dimensional movement—takes place of the whole stent or region of interest, using projection photographs from different heartbeat phases. In the reconstruction of each image volume element (voxel) which is depicted on two projection photographs $A_n$ and $A_j$ from different heartbeat phases p1, p2, with regard to the corresponding object point it is taken into account that in the heartbeat phases of the photographs it lay in different positions $r_{p1}$ and $r_{p2}$. The aforementioned positions are linked here by the known transformation $\Sigma_{p1\_p2}$. With the aid of this transformation, one can thus reconstruct the region of interest and in particular the stent 5 by using the information from all projection photographs with a high level of accuracy, since the influence of the heartbeat movement can be compensated by the transformations.

The invention claimed is:

1. A device for the three-dimensional reconstruction of a moving object in a body volume, comprising a memory for storing a series of two-dimensional projection photographs $(A_1, A_2, \ldots, A_n, \ldots, A_N)$ of the body volume from different directions and states of the body volume, and a data processing unit coupled to the memory for executing the following steps:

a) segmenting a projection image $(Pr_n(Q))$ of at least one feature point (Q) of the object or its surroundings in each of the projection photographs;

b) specifying randomly a spatial reference position $(Q_0)$ for the at least one feature point (Q) of the object or its surroundings on which subsequently all of the projection photographs are to be aligned, wherein the spatial reference position $(Q_0)$ of a corresponding at least one feature point (Q) is randomly specified from two projection photographs (i) that originate from a similar state of the body volume (ii) but from different directions;

c) calculating transformations $(\Sigma_n, \sigma_n)$ of the object space and of the projection photographs which link positions of the feature points for different states of the body volume, wherein a projection of a transformed randomly specified spatial reference position ($Q_0$) coincides with a respective transformed image of a corresponding at least one feature point (Q) for the different states of the body volume; and d) reconstructing the object three-dimensionally from the stored two-dimensional projection photographs using the calculated transformations ($\Sigma_n$, $\sigma_n$), wherein reconstructing includes using all transformed projection photographs from the different states of the body volume.

2. The device as claimed in claim 1, wherein the transformation ($\Sigma_n$) of the object space or the transformation ($\sigma_n$) of the projection photographs is the same image.

3. The device as claimed in claim 1, wherein the transformations ($\sigma_n$, $\Sigma_n$, $\Sigma_{p\_m}$) comprise one of a translation, a rotation, a dilation, and an affine transformation.

4. The device as claimed in claim 1, further comprising an input unit for interactive segmentation in step a).

5. The device as claimed in claim 1, further comprising an image-producing device for producing the series of two-dimensional projection photographs ($A_1, A_2, \ldots, A_n, \ldots, A_N$) of the body volume.

6. The device as claimed in claim 1, further comprising a sensor device for recording a parameter ($E_n$) that characterizes a cyclical self-movement of the body volume in parallel with the production of the projection photographs.

7. A method for the three-dimensional reconstruction of a moving object in a body volume based on a quantity of data which contains a series of two-dimensional projection photographs ($A_1, A_2, \ldots, A_n, \ldots, A_N$) of the body volume from different directions and states of the body volume, comprising the steps of:

a) segmenting a projection image ($Pr_n(Q)$) of at least one feature point (Q) of the object or its surroundings in each of the projection photographs;

b) specifying randomly a spatial reference position ($Q_0$) for the at least one feature point (Q) of the object or its surroundings on which subsequently all of the projection photographs are to be aligned, wherein the spatial reference position ($Q_0$) of a corresponding at least one feature point (Q) is randomly specified from two projection photographs (i) that originate from a similar state of the body volume (ii) but from different directions;

c) calculating transformations ($\Sigma_n$, $\sigma_n$) of the object space and of the projection photographs which link positions of the feature points for different states of the body volume, wherein a projection of a transformed randomly specified spatial reference position ($Q_0$) coincides with a transformed image of a corresponding at least one feature point (Q) for the different states of the body volume; and d) reconstructing the object three-dimensionally from the series of two-dimensional projection photographs using the calculated transformations ($\Sigma_n$, $\sigma_n$) wherein reconstructing includes using all transformed projection photographs from the different states of the body volume.

8. The device as claimed in claim 1, further wherein the two projection photographs that originate from the similar state of the body volume comprise two projection photographs that originate from a heartbeat phase of the same type.

9. The device as claimed in claim 5, further wherein the image-producing device comprises one of (i) an X-ray apparatus, (ii) an NMR device, and (iii) both an X-ray apparatus and an NMR device.

10. The device as claimed in claim 6, further wherein the sensor device comprises one of (i) an electrocardiograph device, (ii) a respiration sensor, and (iii) both an electrocardiograph device and a respiration sensor.

* * * * *